(No Model.)  13 Sheets—Sheet 2.

H. PERRET, A. GROS & H. MILLION.
MACHINE FOR APPLYING CHENILLE TO TULLE.

No. 434,355.  Patented Aug. 12, 1890.

FIG. 1ᵃ

(No Model.) 13 Sheets—Sheet 5.

H. PERRET, A. GROS & H. MILLION.
MACHINE FOR APPLYING CHENILLE TO TULLE.

No. 434,355. Patented Aug. 12, 1890.

FIG. $1^d$

(No Model.)

H. PERRET, A. GROS & H. MILLION.
MACHINE FOR APPLYING CHENILLE TO TULLE.

No. 434,355. Patented Aug. 12, 1890.

FIG. 2.

Witnesses

Inventors (No Model.) 13 Sheets—Sheet 7.
H. PERRET, A. GROS & H. MILLION.
MACHINE FOR APPLYING CHENILLE TO TULLE.

No. 434,355. Patented Aug. 12, 1890.

FIG. 2$^a$ (No Model.) 13 Sheets—Sheet 8.
H. PERRET, A. GROS & H. MILLION.
MACHINE FOR APPLYING CHENILLE TO TULLE.

No. 434,355. Patented Aug. 12, 1890.

FIG. 2ᵇ

(No Model.)

H. PERRET, A. GROS & H. MILLION.
MACHINE FOR APPLYING CHENILLE TO TULLE.

No. 434,355. Patented Aug. 12, 1890.

FIG. 2$^d$ (No Model.) 13 Sheets—Sheet 12.

H. PERRET, A. GROS & H. MILLION.
MACHINE FOR APPLYING CHENILLE TO TULLE.

No. 434,355. Patented Aug. 12, 1890.

FIG. 3ᵃ

(No Model.) 13 Sheets—Sheet 13.

H. PERRET, A. GROS & H. MILLION.
MACHINE FOR APPLYING CHENILLE TO TULLE.

No. 434,355. Patented Aug. 12, 1890.

UNITED STATES PATENT OFFICE.

HENRI PERRET, ARTHUR GROS, AND HENRY MILLION, OF LYONS, FRANCE.

MACHINE FOR APPLYING CHENILLE TO TULLE.

SPECIFICATION forming part of Letters Patent No. 434,355, dated August 12, 1890.

Application filed December 9, 1886. Serial No. 221,085. (No model.) Patented in France August 24, 1886, No. 178,171.

*To all whom it may concern:*

Be it known that we, HENRI PERRET, ARTHUR GROS, and HENRY MILLION, manufacturers of tulle, citizens of the Republic of France, and residents of Lyons, France, have invented new and useful Improvements in Machinery for Applying Pieces of Chenille or similar Material to Tulle or like Fabric, (for which we have obtained a patent in France, No. 178,171, dated August 24, 1886,) of which the following is a specification, reference being had to the accompanying drawings.

Our invention relates to an improved machine designed to apply specks or spots of chenille or other similar material to tulle, gauze, crape, or other light fabrics, and in some cases to heavy fabrics.

In the accompanying drawings, Fig. 1$^a$ is a front elevation, on an enlarged scale, of the upper left-hand quarter-section of the machine on lines 1 2 4 of Fig. 1. Fig. 1$^b$ is a front elevation, on an enlarged scale, of the upper right-hand quarter-section of the machine on line 4 2 3. Fig. 1$^c$ is a front elevation, on an enlarged scale, of the lower left-hand quarter-section of the machine on line 1 2 5 of Fig. 1. Fig. 1$^d$ is a front elevation, on an enlarged scale, of the lower right-hand quarter-section of the machine on line 5 2 3 of Fig. 1. Fig. 2$^a$ is a transverse section, on an enlarged scale, of the upper left-hand quarter-section of the machine on lines 6 8 7 of Fig. 2. Fig. 2$^b$ is a transverse section, on an enlarged scale, of the upper right-hand quarter of the machine on line 7 8 9 of Fig. 2. Fig. 2$^c$ is a transverse section, on an enlarged scale, of the lower left-hand quarter of the machine on line 6 8 10 of Fig. 2. Fig. 2$^d$ is a transverse section, on an enlarged scale, of the lower left-hand quarter-section of the machine on lines 10 8 9 of Fig. 2. Fig. 3$^a$ is a plan view, on an enlarged scale, of the right-hand front portion of the machine illustrated in Fig. 1.

In order to form a series of spots at regular distances apart, the number of which spots corresponds to the width of the piece of fabric to be spotted, we employ a number of parts or devices, some of which are similar and independent for each spot, while others are common to the whole series, and co-operate in the fixing of a spot. Accordingly we will proceed to show how one of these spots is manufactured, and describe the operative parts or devices before passing to the description of the parts which drive them.

The piece of tulle (indicated by a dot-and-dash line, Fig. 2) is drawn from a roller A and conveyed by means of a roller B, having a series of pins or points upon its surface, into a box where the tulle collects. Between the two rollers A and B the tulle or other material bears at $s$ upon a row of pieces S called "holders." On one side of the holder S, slightly below the level of the point $s$ where the tulle passes over the holders S, is the extremity of the chenille, (represented by two dots and a dash line,) which chenille is wound upon bobbins $u'$, and on the other side are tongs $e$, having two jaws which open like scissors. According to our invention a piece of chenille is cut off and drawn into the meshes of the tulle, where it is firmly fixed by the devices hereinafter described. This is effected by fourteen different operations.

Figure 4:
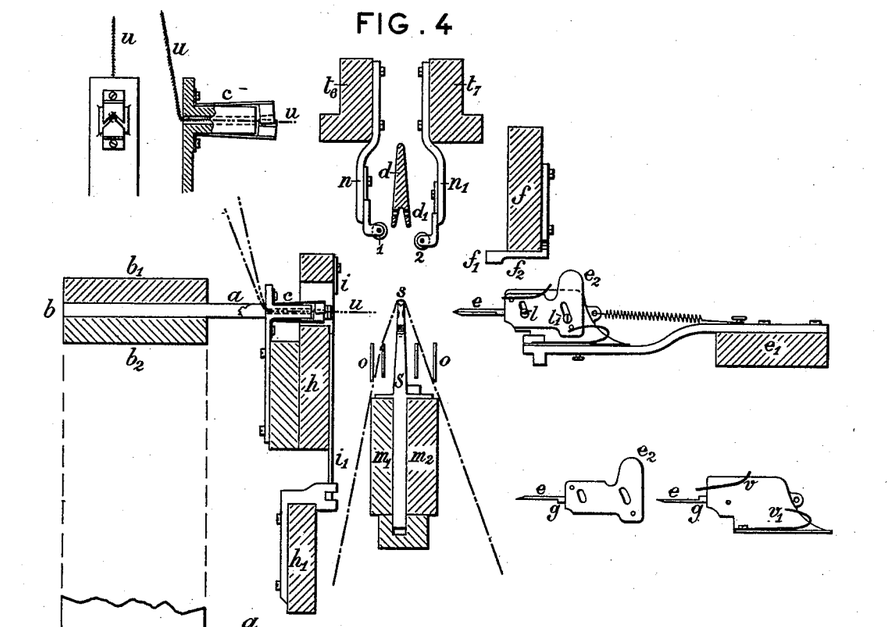
Fig. 4 are views drawn on an enlarged scale and illustrating the operation of the various essential parts which co-operate to fix the spots upon the tulle or other fabric.

The first operation is performed by a pair of tongs $a$, Fig. 4. These tongs have one jaw fixed to a bar $b'$ and the other to the bar $b^2$. These two bars are horizontally movable in opposite directions, so as to close the tongs $a'$. Moreover, they constitute with their jaws a device $b$, called the "advancer." In the first motion the jaws of the tongs $a$ approach each other and grasp the end of the chenille. Between the jaws of each pair of tongs $a$ is a fixed support $c$. This support comprises a small conduit and two small jaws carried by springs. The chenille passes through the conduit and between the jaws, which retain it so firmly that it cannot be caused to advance without an effort.

The second operation is performed by a plate $d$, termed the "aperture-plate," which descends and is applied upon the extremity $s$ of the holders S. Its edge $d'$ is provided with an inverted-V-shaped groove, which fits upon the holders S, so that the tulle is seized and maintained between these two parts.

The third operation is performed by the tongs $e$, which pass through an aperture in the aperture-plate $d$ and between the holders S, and also through the tulle until they come within a short distance of the tongs $a$ of the advancer, which then holds the end of the chenille.

The fourth motion is the opening of the tongs $e$, which opening is due to the descent of the bar $f$, whose tongue $f'$ enters between the jaws of the tongs $e$. These tongs $e$, the two parts of which we have represented in Fig. 4, are constructed in a special manner in order that the tulle cannot be torn when the two jaws, while inserted through its meshes, are caused to open. One of the two parts is movable and the other is fixed. The fixed part carries two springs $v\,v'$, which bear upon studs $e^5$ and $e^6$, respectively, riveted to the movable part. The said fixed part is also provided with two screws $l\,l'$, which enter two slots formed in the movable part. The spring $v$ and the screws $l\,l'$ enable the jaws to oscillate upon an axis at $g$. The spring $v'$ keeps the jaws normally closed.

The fifth operation is performed by the advancer $b$, which carries the extremity of the chenille between the jaws of the open tongs $e$.

The sixth operation consists in the closing of the tongs $e$ by the lifting of the plate $f$, so that the said tongs seize the extremity of the chenille.

The seventh operation is performed by the scissors or clippers $i\,i'$, which cut the chenille between the plate $h$ and the tongs $a$ of the advancer. For this purpose the plate $h$, which carries the upper blade $i$ of the scissors, descends, and the plate $h'$, which carries the lower blade $i'$, ascends. The latter blade slides vertically in a groove formed in the plate $h$.

The eighth motion is performed by the advancer $b$, which opens the jaws of its tongs $a$.

The ninth motion is performed by the tongs $e$, which execute the first part of their backward movement, drawing the piece of chenille into the tulle.

The tenth operation is performed by the holder S, which grasps the piece of chenille near the center thereof. The two parts $S'\,S^2$ of the holder S, which is shown in front view at F, Fig. 4, are carried, one by the bar $m'$ and the other by the bar $m^2$, which bars slide in opposite directions, so as to cause the two parts of the holder S to approach toward or recede from each other. The part of this holder S, which grasps the chenille, is recessed at X on two faces, and along the upper edge is a small groove, Fig. 4, the purpose of which will be set forth. The closing of the holders takes place at the moment when the piece of chenille is between them. For this purpose the part of the holder on the bar $m'$ is fixed by means of two screws; but the part on the bar $m^2$ has a little play upon one of the screws, which play is opposed by a small spring $v^2$, so arranged as to cause the part $S^2$ to bear against the side of the part $S'$.

The eleventh operation is performed by the pinchers $e$, which open a little less than previously, the part $f^2$ of the catch bearing upon the projection $e^2$.

The twelfth operation is also performed by the pinchers $e$, which pass back to their first position, Fig. 4, leaving the piece of chenille in the holders. At the moment when they close again, the plate of the catch $f$ is lifted.

The thirteenth operation is performed by the aperture-plate $d$ and by the advancer $b$ simultaneously, which pass to their first position, Fig. 4. In its ascending movement the aperture-plate $d$ slightly rubs the two extremities of the piece of chenille.

The fourteenth operation is performed by two pressers $n\,n'$, which descend and gradually recede from their vertical position until the roller 1 of the presser $n$ has passed beyond the piece of chenille grasped between the holder. The two rollers 1 and 2 then approach until they press upon the holder, and then again ascend. The roller 1 first encounters the end of the chenille, which is on its side, and bends the same, folding it against the edge of the holder, and descending again a little locates it in the groove before mentioned. The other roller in ascending then performs on its side the same operation. The spot is thus applied and fastened upon the tulle. The action of the pressers is effected very easily, for, as is known, the chenille has a core of very thin wire which the roller of the pressers has no difficulty in forcing back, and which is bent and remains as firmly fixed as if the operation had been performed by hand. It may be added that the groove of the holders facilitates the operation by permitting the two extremities of the piece of chenille to be pressed more firmly against one another.

Figure 5:
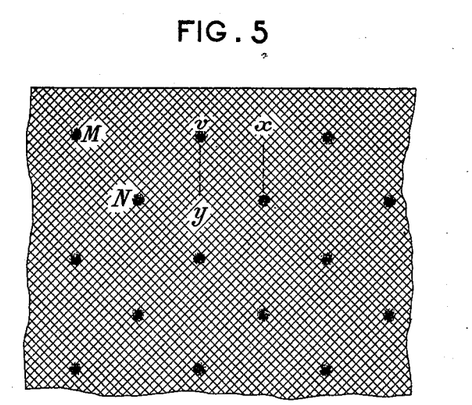
Fig. 5 represents a piece of tulle with spots of chenille fixed upon it by the improved machine.

The series of spots M, Fig. 5, having been applied, the series N has to be applied. For this purpose the tulle has to be moved horizontally from $v$ to $x$ and to be advanced from $v$ to $y$. To accomplish this, the plates $o$, between which the tulle passes, rise and lift the bend of the tulle above the holders S, thus preventing the tulle from touching the latter. At this moment, the slide T, Fig. 1, which carries the tulle-roller and the needle-roller, effects the necessary horizontal motion—viz., from $v$ to $x$, Fig. 5—also carrying with it in its movement the plates $o$. This sliding movement causes the operation of the mechanism R, actuating the needle-roller B, thereby causing the advance of the tulle from $v$ to $y$.

The operative functions of the machine having been described, we will describe succinctly the driving-gear which we employ to cause each part to operate in the above-described manner.

Figure 1:
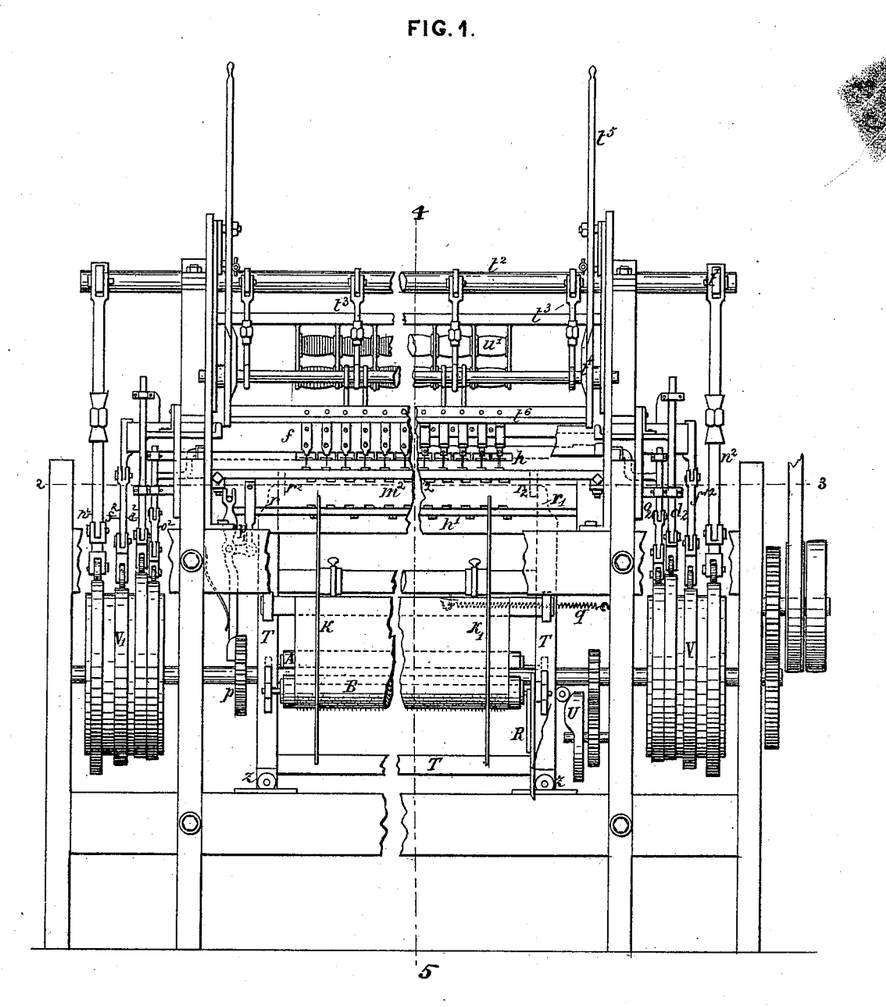
Figure 1 is a front elevation of the improved machine.
Figure 1A:
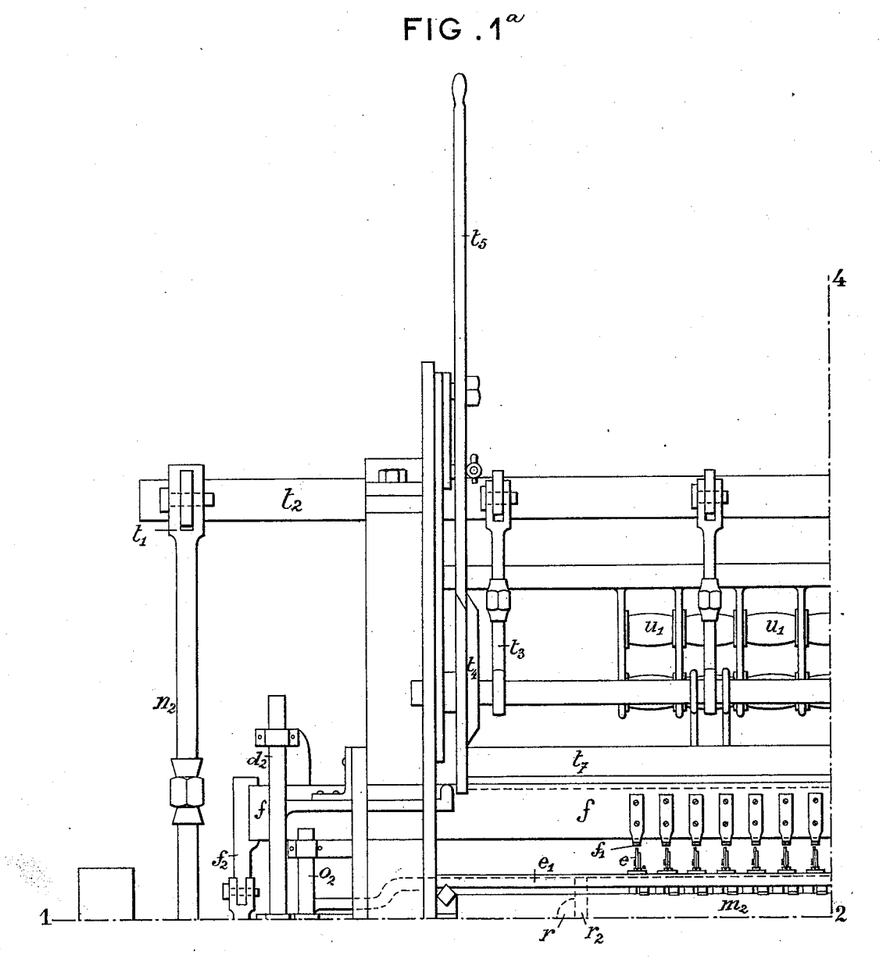
Figure 1B:
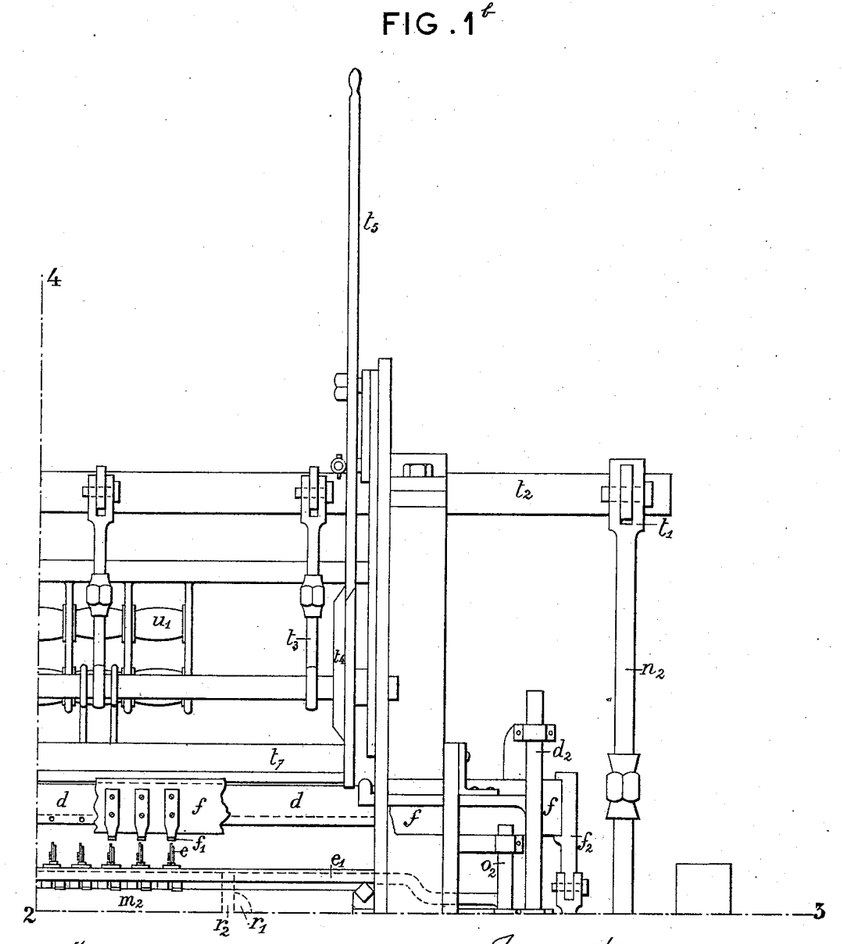
Figure 1C:
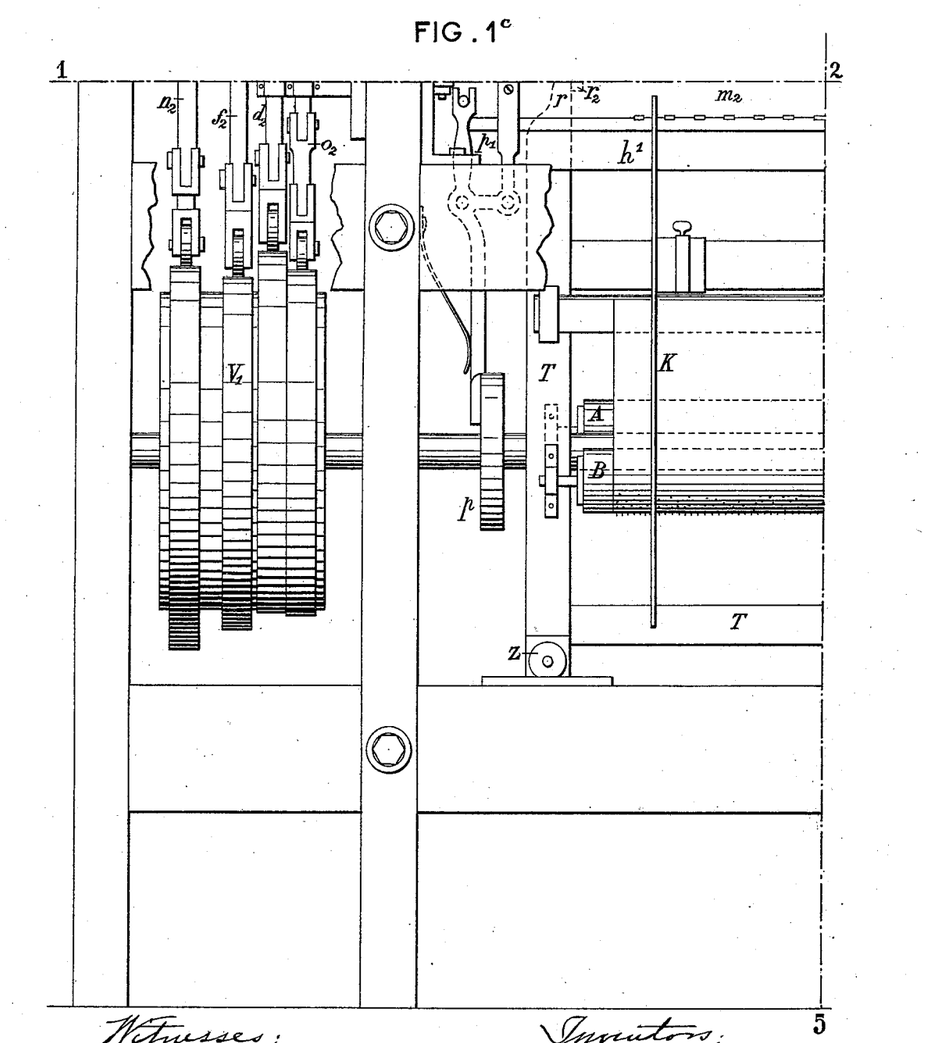
Figure 1D:
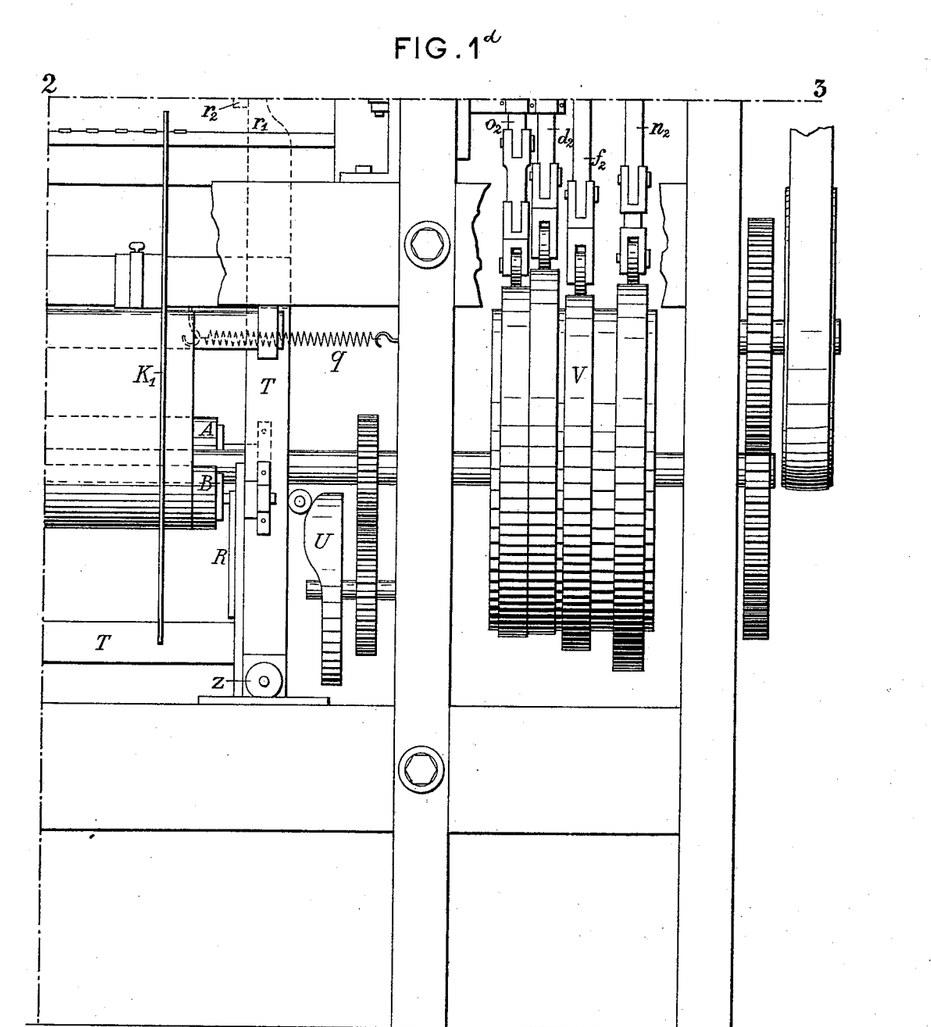
Figure 2:
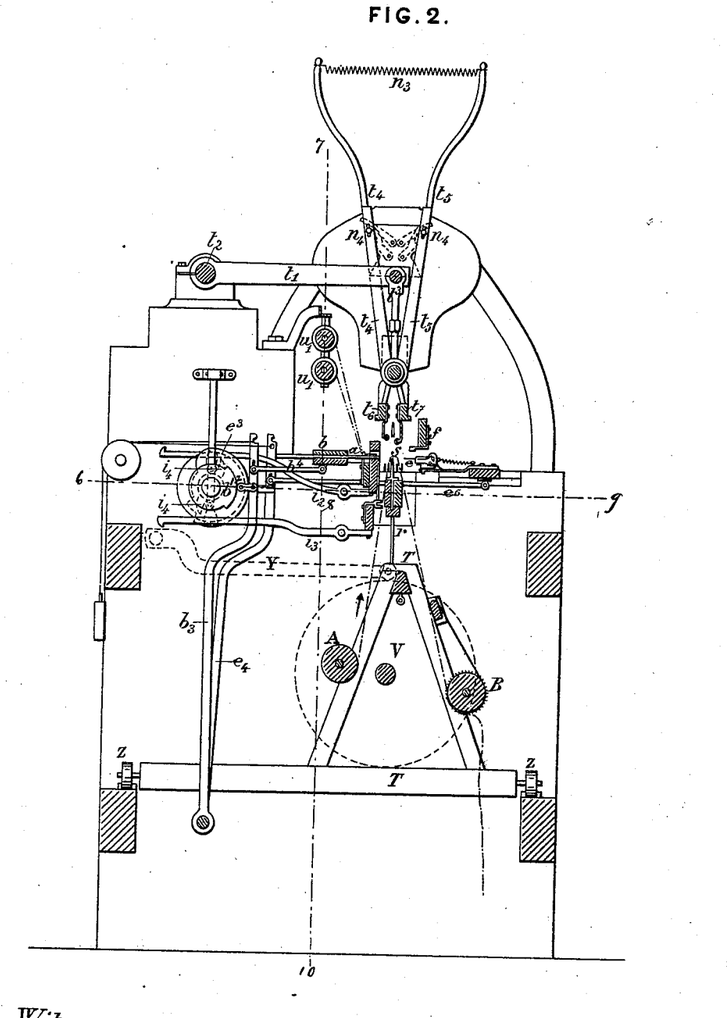
Fig. 2 is a sectional side view of the same.
Figure 2A:
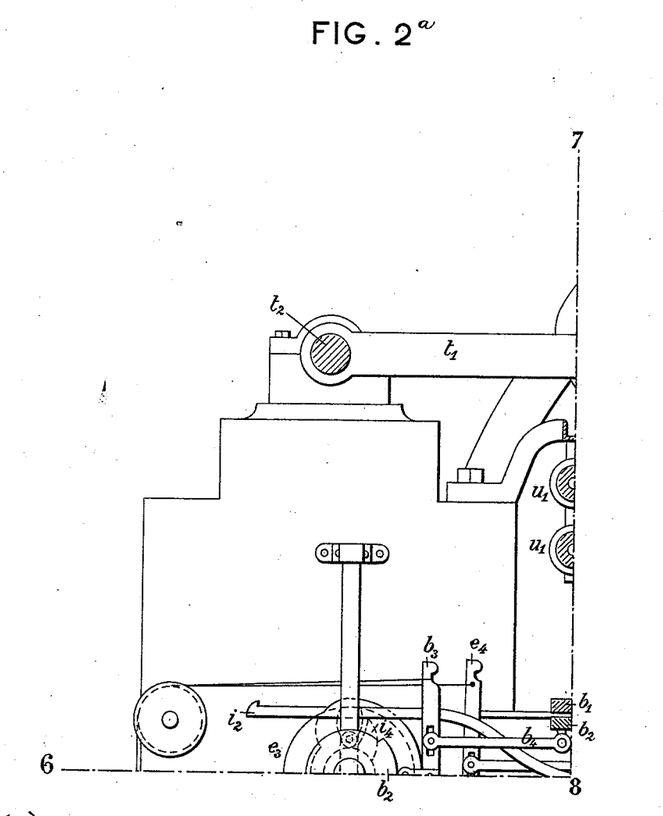
Figure 2B:
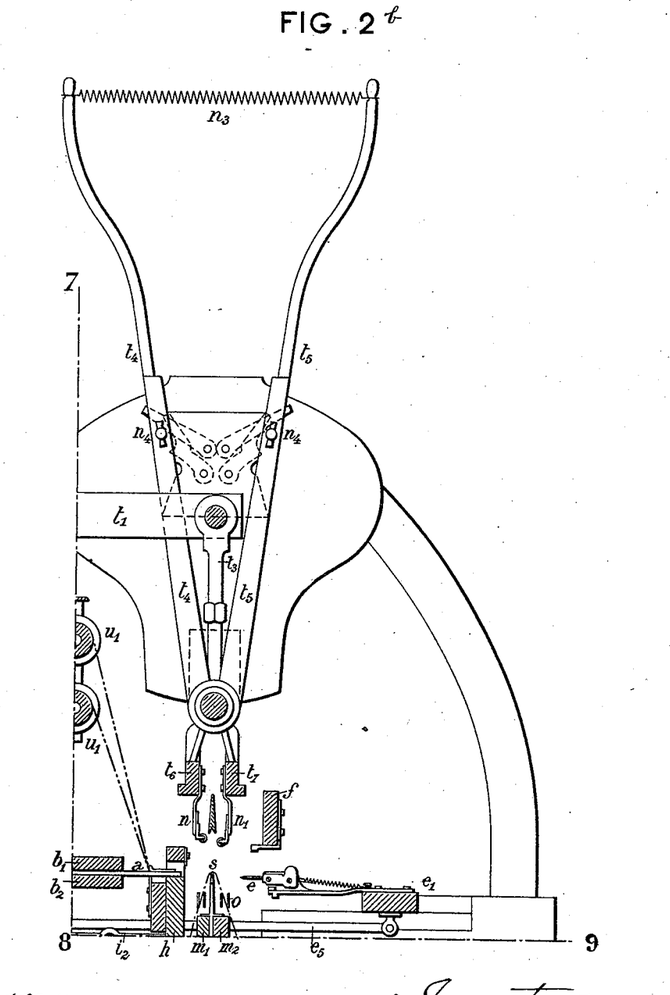
Figure 2C:
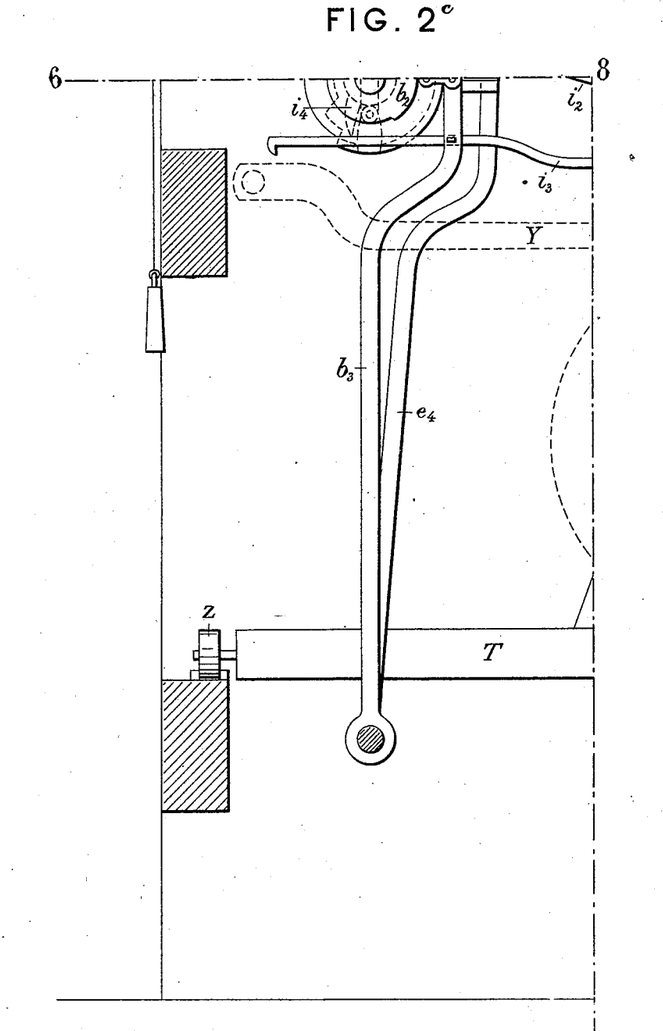
Figure 2D:
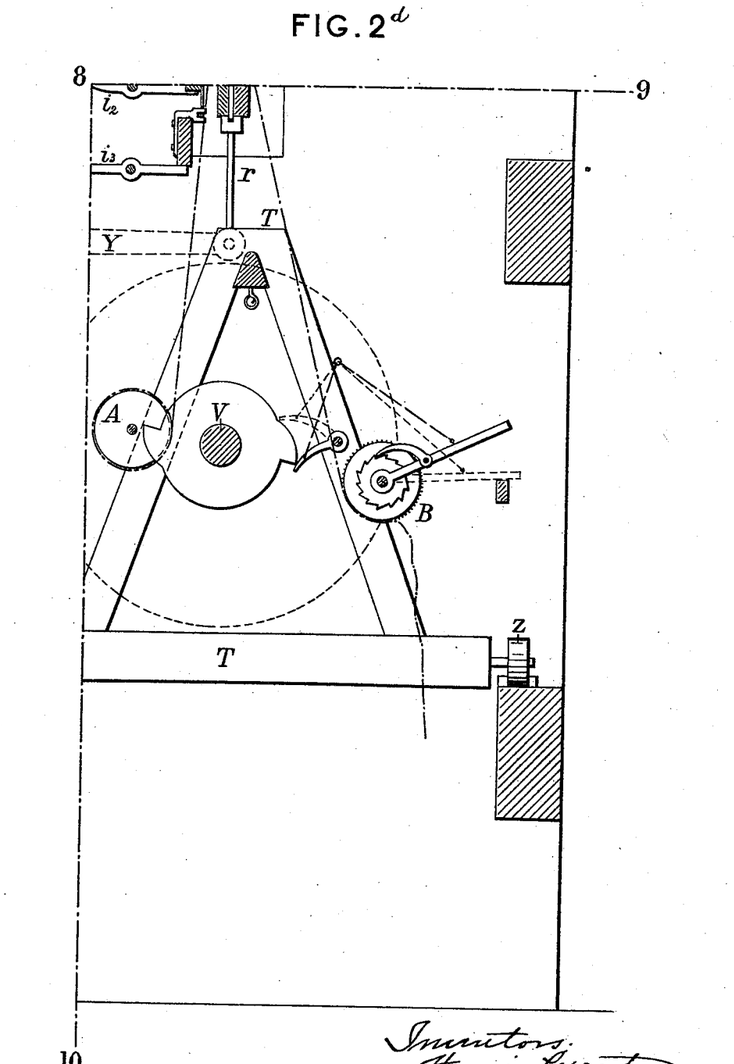
Figure 3:
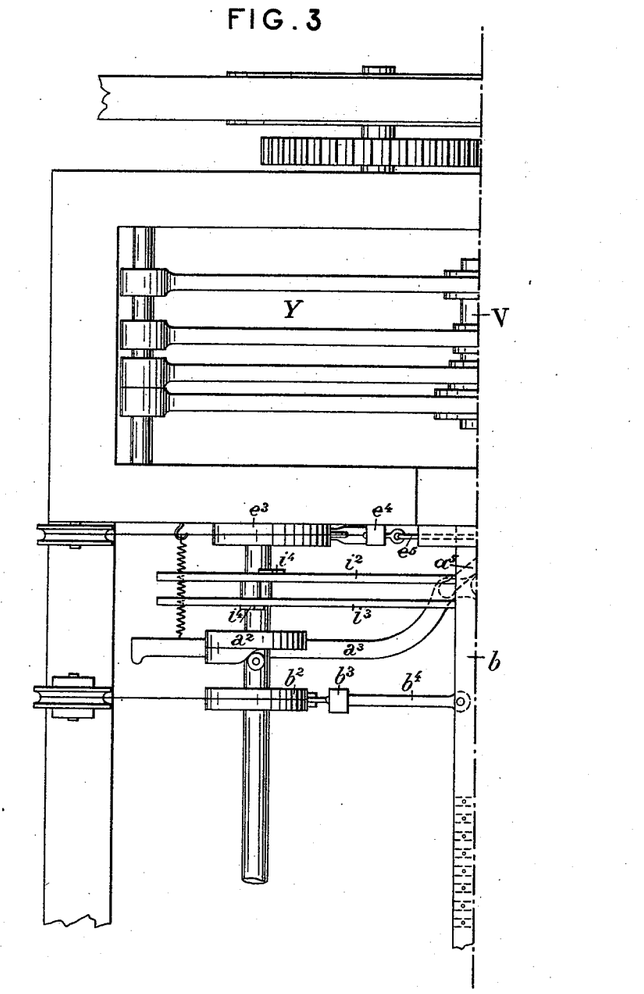
Fig. 3 is a plan, on an enlarged scale, of the right-hand rear portion of the machine.
Figure 3A:
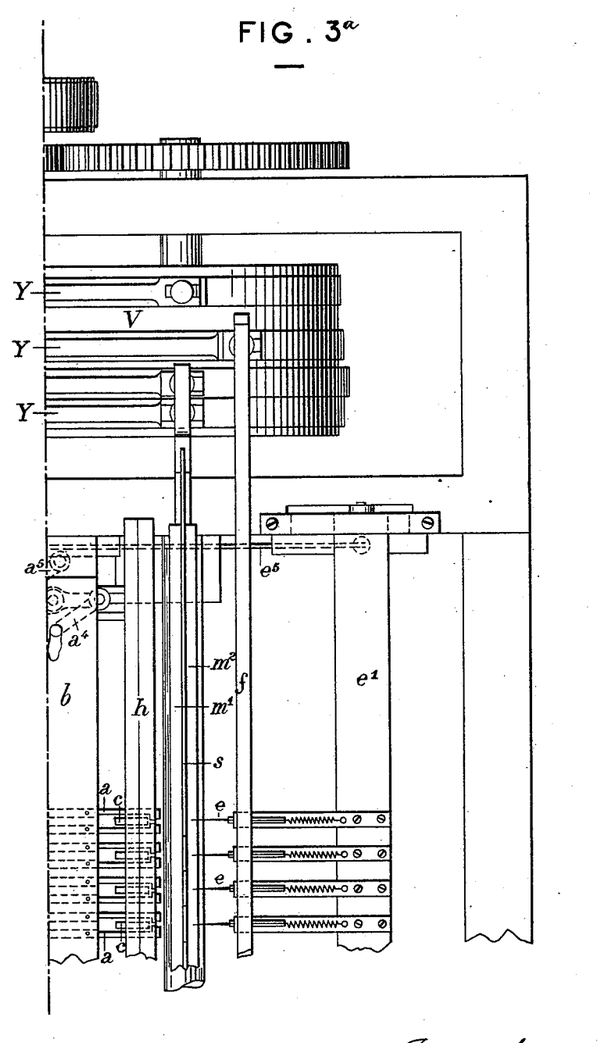

The ascending motions of the aperture-plate $d$, the lifting-plates $o$, and the bars carrying the catch-plates $f$ and the pressers $n$ $n'$ are produced by the cams V V', placed on the right and left hand sides of the machine, which cams lift the said parts at the desired moments by means of the rods $d^2, o^2, f^{12}$, and $n^2$, carrying rollers, Fig. 1, and the rocking rods Y. (See Fig. 3.) The motion of the advancer $b$ is produced by the cam $b^2$, the rocking lever $b^3$, and the rod $b^4$, Figs. 2 and 3, while the opening and closing of the jaws of its tongs $a$ is due to the face-cam $a^2$, the rocking lever $a^3$, and the horizontal levers $a^4$ $a^5$, Fig. 3. The opposite motion of the bars $h$ $h'$, carrying the blades of the clippers or scissors, is due to the operation of the two levers $i^2$ $i^3$, actuated by cams $i^4$. The horizontal motion of the cross-piece $e^2$, which carries the tongs $e$, is produced by the eccentrics $e^3$, the levers $e^4$, and the rods $e^5$, Figs. 2 and 3. The closing motion of the holders S is due to the eccentric $p$ and the levers $p'$, Fig. 1. The ascending and descending motion of the pressers $n$ $n'$, Figs. 1 and 2, is caused by the cams V V', by means of the rods $n^2$, the levers $t'$, the shaft $t^2$, and the rods $t^3$, connected to the bars $t^6$ $t^7$, carrying the said pressers. At each extremity of these bars $t^6$ $t^7$ is placed a device, (represented specially in Fig. 2,) which resembles a pair of pinchers, the upper extremities of whose arms $t^4$ $t^5$ are united by a spring $n^3$, which tends to draw these arms, each of which is provided with a roller $n^4$, together. Each roller bears upon a guide so shaped that the said arms recede from or approach toward one another when they rise or fall in such a manner that the pressers open when descending and close when ascending. The operation of the slide T is due to the cam U overcoming the force of the spring $q$, Fig. 1. This slide moves upon the rollers $z$, and by means of the connecting-plates $r$ $r'$, placed at the ends of its upper part, and the rods $r^2$, below the lifting-plates $o$, it causes the said plates to make the same motion as itself, in order to transport the tulle horizontally to the desired place.

In Fig. 1 of the drawings, the tulle is not shown on the machine. It would, however, occupy the space between the two guides K K', which are movable, according to the breadth of the tulle.

It is obvious that we may modify the construction of the devices for actuating the essential part of the improved machine without departing from the nature of our invention.

We claim in a machine for fixing pieces of chenille or similar material upon tulle or like fabric in order to produce spots thereon—

1. In a machine for ornamenting fabrics, an advancer for feeding chenille to the fabric to be ornamented, consisting of two horizontally-movable bars provided, respectively, with gripping-tongs, and a fixed support provided with spring-jaws for holding the chenille, the arms of the jaws embracing said support, substantially as described.

2. In a machine for ornamenting fabrics, the combination of a feeder for the chenille and fixed spring-jaws for delivering the chenille to the feeder, substantially as described.

3. In a machine for ornamenting fabrics, the combination of a feeder for the chenille and a support for delivering the chenille to the feeder, said support consisting of a tube and spring-jaws disposed at the mouth thereof.

4. In a machine for ornamenting fabrics, the combination of a holder over the edge of which the fabric to be ornamented is stretched or supported and a movable grooved plate which shuts over the extremity of said holder, said holder and plate being provided with registering apertures for the passage of the chenille, substantially as described.

5. In a machine for ornamenting fabrics, the combination of a fabric-holder, a chenille-feeder, and tongs for drawing the chenille through the fabric, comprising a fixed jaw-plate provided with springs $v$ and $v'$, a movable slotted jaw-plate disposed on said fixed plate, provided with studs $e^5$ $e^6$, engaged by said springs, and screws for holding said plates together.

6. In a machine for ornamenting fabrics, the combination of a fabric-holder, a chenille-feeder, tongs for drawing the chenille through the fabric, composed of automatically-closing spring-jaws, and means for opening said jaws at proper intervals, substantially as described.

7. In a machine for ornamenting fabrics, the combination of a fabric-holder, a chenille-feeder, tongs for drawing the chenille through the fabric, composed of automatically-closing spring-jaws, one of said jaws being provided with a projection $e^2$, and a jaw-opener consisting of the movable bar $f$, provided with the tongue $f'$ and part $f^2$, substantially as described.

8. In a machine for ornamenting cloth, the combination of a chenille-feeder, a cloth-feeder comprising two laterally-movable parts having a stretching-edge over which the cloth passes, each of said parts being provided with registering recesses forming apertures when the parts are closed for holding the chenille, and tongs for passing the chenille through the fabric.

9. In a machine for ornamenting cloth, the bar $m'$, the part S', carried thereon, the bar $m^2$, the pivoted part S², carried thereon, the spring $v^2$, for closing said pivoted part S² against the part S', said parts S' and S² being provided with grooved extremities and recessed faces, substantially as described.

10. In a machine for ornamenting fabrics, the combination of a fabric-holder, means for applying the chenille to the fabric, and pressers for folding and pressing the chenille onto the fabric, consisting of vertically-movable bars provided with dependent arms carrying rollers which engage the chenille fabric on opposite sides of said holder, substantially as described.

11. In a machine for ornamenting fabrics, the combination of two rollers for carrying the fabric, a slide supporting said rollers, a fabric-holder, a pair of parallel bars disposed on each side of said holder, the bars of each pair being disposed on opposite sides of the fabric, means for lifting said bars above said fabric-holder, and means for shifting said slide while said bars are elevated, substantially as described.

In testimony whereof we have hereunto signed our names in the presence of two subscribing witnesses.

HENRI PERRET.
      ARTHUR GROS.
      HENRY MILLION.

Witnesses:
 GEORGES FREYDIER DUBREUL,
 XAVIER ZANICOT.